Nov. 29, 1949 W. L. H. DOYLE 2,489,405
DUAL FUEL ENGINE
Filed Aug. 9, 1947 4 Sheets-Sheet 1

INVENTOR.
William L. H. Doyle
BY
Charles M. Fryer
ATTORNEY.

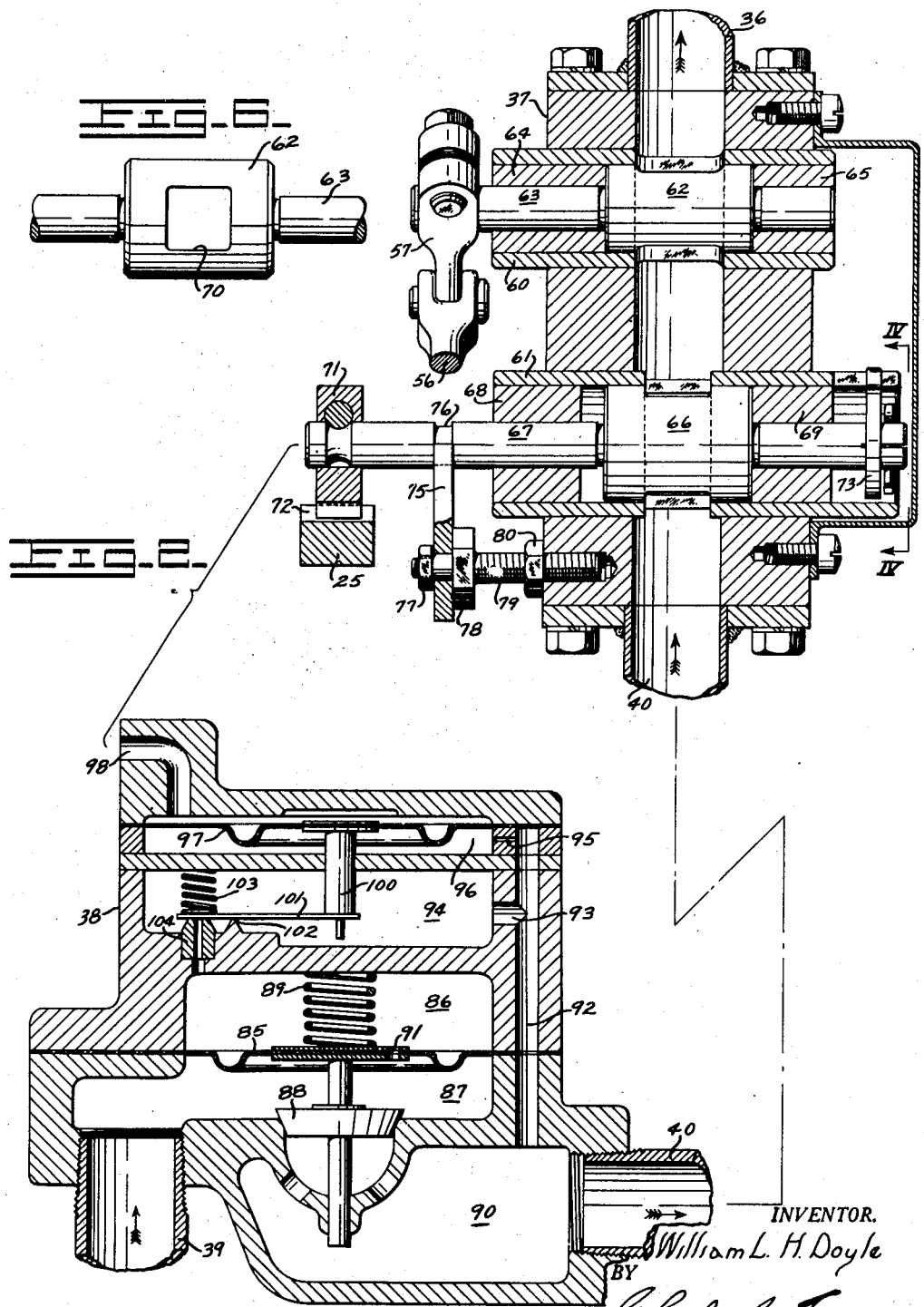

Nov. 29, 1949 W. L. H. DOYLE 2,489,405
DUAL FUEL ENGINE
Filed Aug. 9, 1947 4 Sheets-Sheet 3
Fig_3_
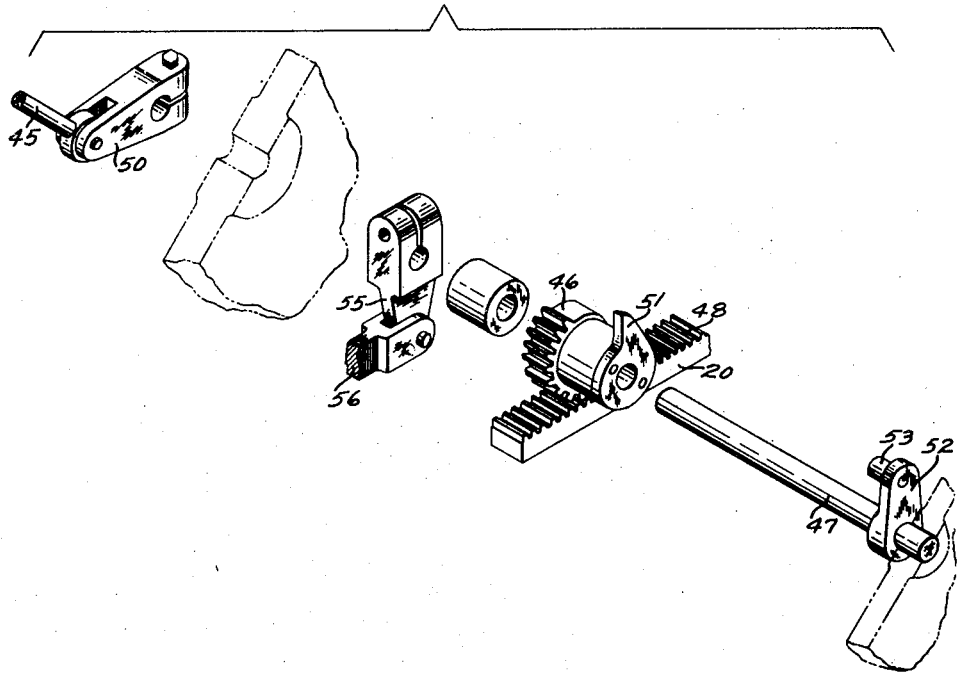
Fig_4_
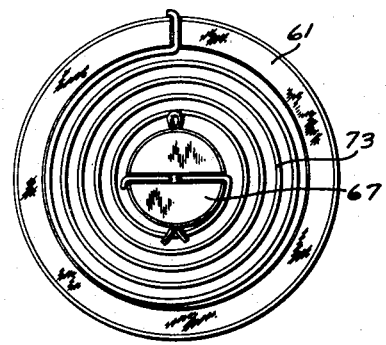
Fig_5_
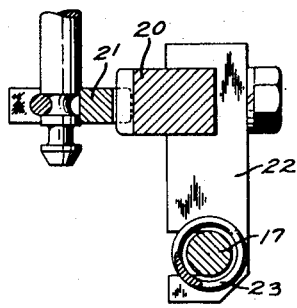
INVENTOR.
William L. H. Doyle
BY
Charles M. Fryer
ATTORNEY.

Nov. 29, 1949     W. L. H. DOYLE     2,489,405
DUAL FUEL ENGINE

Filed Aug. 9, 1947     4 Sheets-Sheet 4

INVENTOR.
William L. H. Doyle
BY
Charles M. Fryer
ATTORNEY.

Patented Nov. 29, 1949

2,489,405

UNITED STATES PATENT OFFICE 2,489,405

DUAL FUEL ENGINE

William L. H. Doyle, Peoria, Ill., assignor to Caterpillar Tractor Co., San Leandro, Calif., a corporation of California Application August 9, 1947, Serial No. 767,824

2 Claims. (Cl. 123—127)

1

This invention relates to dual fuel engines and more particularly to fuel supply and control means for an engine of the kind adapted to operate as a direct injection compression ignition engine on oil fuel or as a high compression gas engine with oil employed only for pilot or ignition purposes.

Dual fuel engines are commonly employed where a source of supply of natural gas or other inexpensive gas fuel is available but are adapted to operate on oil as conventional compression ignition engines in the event of failure of the cheaper gas fuel supply.

It is an object of the present invention to provide a dual fuel engine and fuel control mechanism thereon whereby both gas and oil fuel may be controlled by the same governor system. A further object of the invention is the provision of an engine of this kind with simple means for converting the fuel from one type to another and with means operating automatically in conjunction therewith to discontinue the flow of gas to the engine as the fuel is converted to oil. A further object of the invention is to provide an automatic control for the gas supply in response to engine requirements. Still further and more specific objects and advantages of the invention are made apparent in the following specification wherein, by reference to the accompanying drawings, the invention is disclosed in further detail.

In the drawings:

Fig. 2 is a sectional view through a gas control valve and a pressure regulating valve taken on the line II—II of Fig. 1;

Fig. 3 is a view in separated relation of a part of the control mechanism illustrated in Fig. 1;

Fig. 4 is an enlarged detail of a torsion spring assembly taken on the line IV—IV of Fig. 2;

Fig. 5 is an enlarged detail section taken on the line V—V of Fig. 1;

Fig. 6 is a detail of a portion of one of the valve mechanisms illustrated in Fig. 2;

Figure 1:
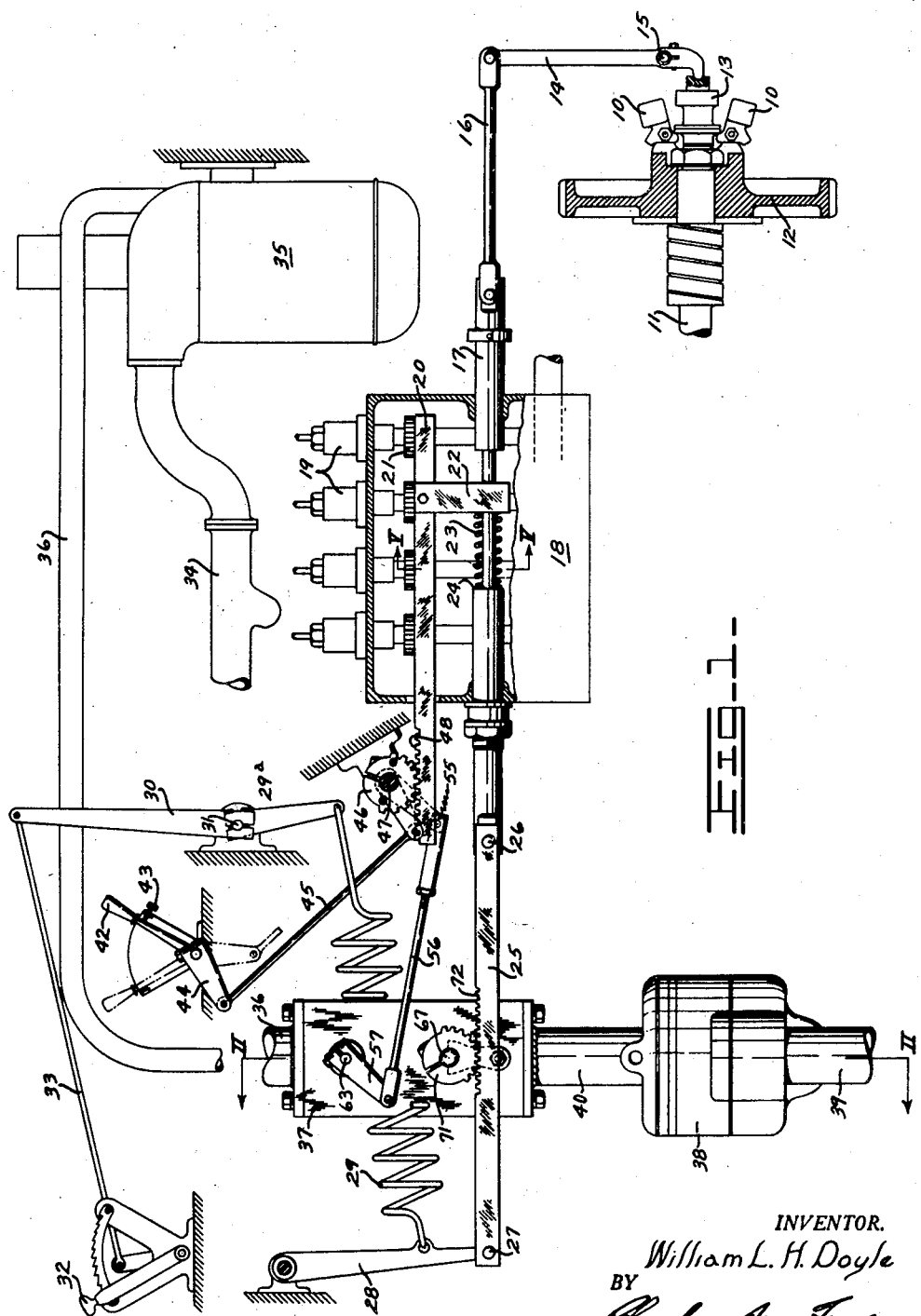
Fig. 1 is a schematic view of the fuel control system of a dual fuel engine embodying the present invention.

A conventional governor mechanism for an internal combustion engine is illustrated in Fig. 1 as comprising flyweights 10 pivoted with relation to an engine camshaft 11 driven by the usual train of gears from the engine crankshaft, one

2 of such gears being illustrated at 12. Upon spreading of the flyweights in response to engine speed, a fitting 13 is urged to the right as viewed in Fig. 1 to swing a lever 14 about its pivotal support 15. The lever 14 is connected as by link 16 with a slide-bar 17 mounted for reciprocation with relation to a conventional fuel pump housing 18. Fuel pumps 19 in the housing 18 are of the type in which the quantity of fuel oil injected into the combustion chamber of the engine may be metered by rotation of the pump plungers as they are reciprocated. This rotation is effected by a toothed rack-bar 20 engaging gears 21 carried by the pump plungers. As is conventional practice, the rack-bar 20 is connected to the slide-bar 17 for movement therewith by means of a coupling member 22. Ordinarily the coupling 22 is rigidly fixed to the slide-bar 17 but in the present instance it is slidable on the bar and connected thereto for movement with the bar only through a spring 23 compressed between the coupling and the shoulder 24 on the slide-bar for a purpose that will be apparent as the description proceeds.

A link bar 25 is pivotally connected as at 26 with one end of the slide-bar and at 27 to the lower end of a lever 28 pivotally supported by a fixed part of the engine. A governor spring 29 is connected with the lever 28 and is adjustably tensioned by levers 29a and 30 fixed to a common pivotally supported shaft 31. A hand actuated governor control lever 32 is connected with the lever 30 as by a rod 33. Thus, adjustment of the hand actuated control lever 32 will, through tensioning of the spring 29, establish operation of the governor at any desired position and when the engine is operating with oil as a fuel the proper quantities of oil will be injected into the combustion chambers by the pumps 19.

When the engine is operating with gas as a fuel, the gas is introduced to an intake manifold 34 but first preferably passed through an air cleaner 35 to insure its thorough mixture with the air in the manifold and consequently to insure an equally rich distribution of fuel to all cylinders. The gas enters the air cleaner 35 through a pipe 36 after it has passed through a fuel control valve 37 and a vacuum controlled pressure regulating and automatic cut-off valve 38 interposed in a supply line 39. The control valve 37 and the pressure regulating valve 38 are connected with each other as by a pipe 40.

Assuming that the engine has been started and is operating with oil as a fuel, the supply of gas to the intake manifold will have been cut off.

In order to operate the engine on gas, the supply of gas must be permitted to flow and at the same time the quantity of fuel oil must be reduced until it is sufficient only for pilot or ignition purposes. The hand lever shown at 42 in Fig. 1 is provided for this purpose. The broken line position of this lever represents operation of the engine on fuel oil with the rack-bar 20 free to slide to its extreme open or full fuel position which would be somewhat to the right of the position illustrated. In order to convert operation of the engine to gas fuel, the lever 42 is swung to its full line position against an adjustable stop screw 43 and, through an associated lever 44, it actuates a connecting rod 45 to lock a segment gear 46 on a shaft 47 against rotation in a counter-clockwise direction. The segment gear 47 meshes with a racked portion 48 formed on the rack-bar 20 and thus prevents sliding of the rack-bar to the right any further than is necessary to effect delivery of the required amount of fuel for ignition purposes. The manner in which the connecting rod 45 controls the rotation of the gear 46 is illustrated in Fig. 3. In this view, the rod 45 is shown as pivotally connected with the lever 50 adapted to be clamped to the shaft 47. The gear 46 is mounted for rotation relative to the shaft 47 and has a radially projecting ear 51 fixed to its hub and the shaft 47 carries a lever 52 with a stop pin 53 projecting therefrom in a position to engage the ear 51. Thus, when the hand lever 42 is swung to the full line position in Fig. 1, the shaft 47 is rotated in a clockwise direction until the pin 53 engages behind the ear 51 to also rotate the segment gear 46 clockwise, if necessary, until it attains an established position and the pin 53 remains against the ear 51 to prevent counter-clockwise rotation of segment gear 46. At the same time that the fuel oil control mechanism is in this manner adjusted to deliver a quantity of oil sufficient only for ignition purposes, gas is permitted to flow through the control valve 37. To this end the shaft 47 carries a lever 55 connected as by a rod 56 with a lever 57 which opens the shut-off valve included in the control valve 37.

The movement of the rack-bar 20 and adjustment of the fuel pumps to meter a small quantity of oil for ignition purposes may be accomplished without disturbing the operation or setting of the governor because of the spring 23 interposed between the coupling 22 and the governor slide-bar 17. This spring is simply compressed as the rack-bar is moved toward the left for this purpose. It should be understood that the spring 23 is sufficiently rigid to permit normal functioning of the governor when the rackbar 20 is left free to slide in response to variations in governor position.

The construction of the control valve 37 is best illustrated in Fig. 2 of the drawings wherein the body of the valve is shown as having a continuous bore extending from end to end thereof intercepted by transverse bores receiving a valve sleeve 60 and a valve sleeve 61. The valve sleeve 60 is centrally perforated to provide a valve opening adapted to be closed by a rotatable valve plug 62 carried on a shaft 63 and the shaft is supported in suitable bearings 64 and 65. It is to the extending end of the shaft 63 that the lever 57 is connected and rotation of this shaft effects opening or closing of the valve. The valve sleeve 61 is also provided with a central opening closed by a valve plug 66 carried on a rotatable shaft 67 supported in bearings 68 and 69. Both of the valve plugs 62 and 66 are preferably provided with rectangular valve openings as illustrated at 70 in Fig. 6 of the drawings and the openings through the valve sleeves 60 and 61 are similarly shaped. The rectangular valve openings are preferred to circular openings because upon either opening or closing of the valve by rotation of the valve plug, the rate of change in flow through the valve is more nearly uniform through registering rectangular openings than registering circular openings.

The stem 67 of the valve 66 which is employed for metering the quantity of gas which flows to the engine is fitted with a segment gear 71 and this gear meshes with a toothed portion 72 of the bar 25. As the bar 25 moves with the governor control slide-bar 17, the metering valve 66 will be opened and closed in response to governor operation. In order to insure against backlash in the meshing engagement between the segment gear 71 and gear teeth 72 a torsion spring 73, also illustrated in Fig. 4, is connected between the valve stem 67 and the valve sleeve 61. Metering valve 66 is also adjustable to vary the maximum quantity of gas that can pass through it so that accommodation can be made for gases of different unit energy content. This is accomplished by a plate 75 provided with a bifurcated end engaging in a slot 76 formed in the stem of the valve 67 to retain it against endwise movement with respect to the sleeve 61. The plate 75 is carried between nuts 77 and 78 on a threaded stud 79 locked against adjustment by a nut 80. Upon loosening of the nuts 77 and 80, the stud 79 may be rotated to advance inwardly or outwardly and thus to adjust the position of the shaft 67 and the relative position of the valve openings of the plug 66 and the sleeve 61. In using a gas of high unit energy content it is, therefore, possible to reduce the maximum amount of gas that can flow through the metering valve through adjustment of the stem 67.

Because the gas employed as a fuel may be of varying or too high pressure at its source, any suitable pressure regulating valve (not shown) may be employed. A second pressure regulator 38 of conventional construction is, however, interposed in the line through which gas is directed to the control valve 37 for the purpose of regulating the flow of gas to the engine depending upon its requirements as reflected by variations in the pressure in the intake manifold. This regulator also serves the purpose of cutting off altogether the flow of gas to the engine when it is not in operation or in the event it should stall. The construction of the regulator 38 is illustrated in Fig. 2 of the drawings wherein it is shown as having a main chamber in communication with the intake pipe 39 divided by a diaphragm 85 to form a spring chamber 86 and a valve chamber 87. A valve 88 in the valve chamber is urged to a closed position by a spring 89 normally to prevent flow of gas from the main chamber into a discharge chamber 90 from which it will flow through pipe 40 to the control valve. Gas pressure, when the engine is not in operation, is equalized in the chambers 86 and 87 through an orifice 91. When the engine is in operation, a low pressure condition exists in the discharge chamber 90 because of its communication with the intake manifold of the engine which is subject to suction. This low pressure is communicated through a passage 92 and an orifice 93 with a low pressure chamber 94 and is also communicated through an orifice 95 with the lower part 96 of a chamber containing a diaphragm 97. The upper portion of this diaphragm chamber is in communication with the atmosphere through a vent passage 98.

Now, assuming that the engine is in operation, the low pressure condition within the discharge chamber 90 is communicated both to the chamber 94 and the chamber 96 below the diaphragm 97. Thus, atmospheric pressure on top of the diaphragm 97 depresses a stem 100 connected therewith and rocks a valve lever 101 about its fulcrum support 102 against the action of a valve closing spring 103. This effects opening of a valve orifice 104 through which pressure from the chamber 86 discharges into the chamber 94. This reduction of pressure in the chamber 86 causes raising of the diaphragm 85 to open the valve 88. The extent of opening of the valve is, therefore, determined by the operation of the engine and when the engine is operating at a relatively high speed creating a very low pressure in the discharge chamber 90, the valve 88 will be opened wider than under low speed conditions where the pressure in the intake manifold and the chamber 90 is greater. In the event that the engine should stall or be shut down without attention to the fuel supply, the flow of gas will automatically be shut off due to the rise in pressure in the discharge chamber 90.

The foregoing applies to the operation of an engine under ordinary atmospheric conditions. However, if the invention is employed in connection with a supercharged engine, the pressure conditions in the intake manifold will, of course, be entirely different. In this event, these pressure conditions can be utilized in the pressure regulator 38 simply by connecting the opening 98 thereof with the intake manifold 34 of the engine.

Figure 7:
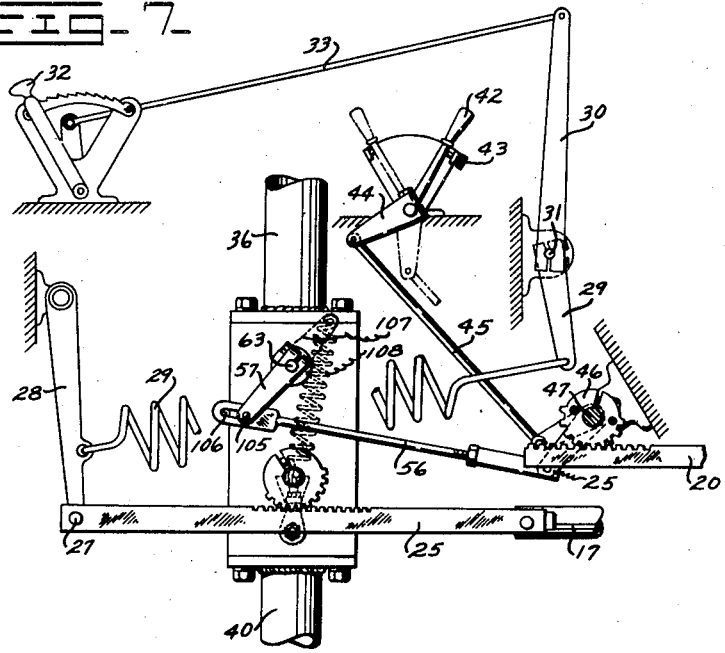
Fig. 7 is a schematic view of a portion of a fuel control mechanism like that shown in Fig. 1 illustrating a modification.
Figure 8:
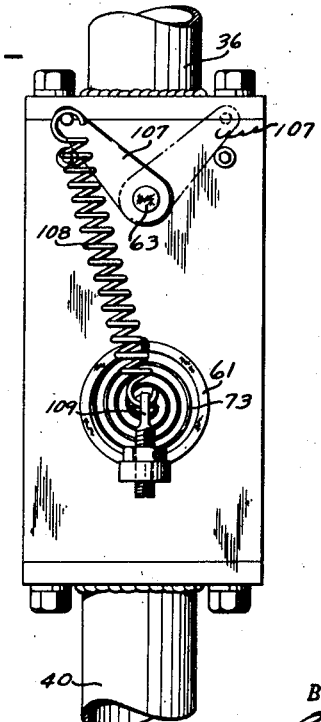
Fig. 8 is an enlarged detail showing the opposite side of the fuel control valve illustrated in Fig. 7.

It is in some instances desirable when the engine is operating on gas that the supply of fuel oil to the combustion chambers normally used for ignition purposes only be increased to meet temporary or unusual torque requirements. Such a practice is desirable if the engine is safeguarded against the introduction of so much combined gas and fuel oil that its capacity to withstand the operating pressures developed is exceeded. The modified form of the invention illustrated in Figs. 7 and 8 provides a means for supplementing the gas fuel with additional fuel oil but at the same time safeguarding the engine against the development of excessive pressures which might result from too much fuel. In Fig. 7 the control valve and its associated parts are schematically illustrated in the same general arrangement as in Fig. 1, however, the connection between the rod 56 and the lever 57 of the shut-off valve is formed by a pin 105 in the lever 57 extending through an elongated slot 106 in the rod 56. Consequently, when the engine is operating on gas in its full throttle position and in the event that it should be subjected to a temporary overloaded condition requiring additional torque, the lever 42 may be moved toward the left a short distance, thus, permitting limited rotation of the gear 46 and movement of the rack-bar 20 to the right. This will result in adjustment of the fuel pumps to meter a greater quantity of oil to the combustion chambers of the engine. The quantity of oil thus directed to the combustion chambers while the engine is operating on gas is limited by the length of the slot 106 and in the event the lever 42 is moved too far to the left, the outer end of the slot will engage the pin 105 and swing the shut-off valve lever 57 toward a closed position. In the construction shown and with particular reference to Fig. 8, the shut-off valve stem 63 is provided with an auxiliary control lever 107. A spring 108 normally under tension connects this lever with an anchor 109 in a position directly below the shaft 63. Thus, if the shut-off valve is swung toward its closed position beyond a vertical central position of the lever 107, the spring 108 will be effective to close the valve entirely by moving the lever 107 to the broken line position illustrated in Fig. 8. Under this condition the engine will continue to operate on the increased supply of fuel oil but will be safeguarded against damage which might result from metering too large a quantity of fuel oil at the same time that it is operating on gas.

I claim:

1. In a dual fuel engine, a fuel pump system for oil including a slidable bar for effecting metering adjustment of the pump, a gas supply system including a throttle valve and a second slidable bar substantially parallel to the first named bar for adjusting the valve, a governor connected with the second slide-bar for control of the throttle valve, a resilient connection between the first and second slidable bars whereby the second bar can respond to governor action independently of the first bar, and means for securing the first bar against movement toward an increased fuel position.

2. In a dual fuel engine, a fuel pump system for oil including a slidable bar for effecting metering adjustment of the pump, a gas supply system including a throttle valve and a second slidable bar substantially parallel to the first named bar for adjusting the valve, a governor connected with the second slide-bar for control of the throttle valve, a resilient connection between the first and second slidable bars whereby the second bar can respond to governor action independently of the first bar, and means for securing the first bar against movement toward an increased fuel position while permitting it to move toward a decreased fuel position in response to governor action.

WILLIAM L. H. DOYLE.

REFERENCES CITED

The following references are of record in the file of this patent:

UNITED STATES PATENTS

| Number | Name | Date |
|---|---|---|
| 1,065,551 | Russ | June 24, 1913 |
| 1,882,990 | Schur | Oct. 18, 1932 |
| 2,340,954 | Garretson | Feb. 8, 1944 |
| 2,400,219 | Barnaby et al. | May 14, 1946 |
| 2,400,247 | Miller et al. | May 14, 1946 |

FOREIGN PATENTS

| Number | Country | Date |
|---|---|---|
| 537,024 | Great Britain | June 5, 1941 |

OTHER REFERENCES

"The Oil Engine," Dec. 1941, pages 199–201, incl.